(12) United States Patent
Shaull et al.

(10) Patent No.: US 11,149,727 B2
(45) Date of Patent: Oct. 19, 2021

(54) HIGH PRESSURE COMMON RAIL FUEL PUMP OUTLET CHECK VALVE SPRING RETAINER METHOD

(71) Applicant: CUMMINS INC., Columbus, IN (US)

(72) Inventors: Anthony A. Shaull, Columbus, IN (US); Tamas Rauznitz, Columbus, IN (US); Brian M. Watson, Nashville, TN (US); Patrick D. Chasteen, Columbus, IN (US); Luke Allen Jones, Columbus, IN (US)

(73) Assignee: Cummins Inc., Columbus, IN (US)

( * ) Notice: Subject to any disclaimer, the term of this patent is extended or adjusted under 35 U.S.C. 154(b) by 333 days.

(21) Appl. No.: 15/571,447

(22) PCT Filed: May 15, 2015

(86) PCT No.: PCT/US2015/030986
§ 371 (c)(1),
(2) Date: Nov. 2, 2017

(87) PCT Pub. No.: WO2016/186607
PCT Pub. Date: Nov. 24, 2016

(65) Prior Publication Data
US 2018/0180007 A1 Jun. 28, 2018

(51) Int. Cl.
*F04B 53/10* (2006.01)
*F16K 15/06* (2006.01)
*F16K 15/04* (2006.01)
*F04B 19/22* (2006.01)
(Continued)

(52) U.S. Cl.
CPC ......... *F04B 53/1072* (2013.01); *F02M 59/02* (2013.01); *F02M 59/462* (2013.01);
(Continued)

(58) Field of Classification Search
CPC .. F04B 53/1072; F02M 59/462; F02M 59/02; F02M 59/464; F02M 59/485; F02M 63/0042; F02M 63/0054; F02M 63/0077
(Continued)

(56) References Cited

U.S. PATENT DOCUMENTS 2,234,932 A * 3/1941 Schlaupitz ........... F02M 59/462
137/516.27
2,421,475 A * 6/1947 Beeh ................... F02M 59/462
123/457
(Continued)

OTHER PUBLICATIONS

International Search Report and Written Opinion dated Aug. 18, 2015 in PCT/US2015/030986.
(Continued)

*Primary Examiner* — Nathan C Zollinger
*Assistant Examiner* — Timothy P Solak
(74) *Attorney, Agent, or Firm* — Faegre Drinker Biddle & Reath LLP

(57) ABSTRACT

The present disclosure generally relates to a pumping element of a fuel pump for an internal combustion engine wherein the pumping element comprises a first flow chamber; a second flow chamber in fluid connection with the first flow chamber, the second flow chamber including a shoulder; a check valve including a first insert and a second insert, the first insert being movable between a first position wherein the first insert forms a seal that inhibits fluid flow between the first and second flow chambers and a second position wherein the first insert permits fluid flow between the first and second flow chambers, the second insert being inserted into the second flow chamber to an extent limited by the shoulder; and a spring having a first end engaging the first insert and a second end engaging the second insert; wherein the first insert moves from the first position to the
(Continued)

second position against a biasing force of the spring in response to pressurized fluid in the first flow chamber.

12 Claims, 4 Drawing Sheets

(51) Int. Cl.
    *F02M 59/02*     (2006.01)
    *F02M 59/46*     (2006.01)
    *F02M 63/00*     (2006.01)
    *F16K 15/02*     (2006.01)

(52) U.S. Cl.
    CPC ............ *F04B 19/22* (2013.01); *F16K 15/044* (2013.01); *F16K 15/063* (2013.01); *F02M 59/464* (2013.01); *F02M 63/0042* (2013.01); *F02M 63/0054* (2013.01); *F16K 15/026* (2013.01)

(58) Field of Classification Search
    USPC ....................................................... 29/525.03
    See application file for complete search history.

(56) References Cited

U.S. PATENT DOCUMENTS

| | | | |
|---|---|---|---|
| 2,612,841 A * | 10/1952 | Lasley | ................. F02M 59/462 417/501 |
| 4,046,494 A | 9/1977 | Salzgeber et al. | |
| 4,531,672 A * | 7/1985 | Smith | .................. F02M 57/024 123/446 |
| 4,700,741 A | 10/1987 | Murphy | |
| 5,241,986 A * | 9/1993 | Yie | ......................... B05B 1/306 137/512 |
| 5,715,795 A * | 2/1998 | Guentert | .............. F02M 59/366 123/467 |
| 6,217,002 B1 | 4/2001 | Shafer | |
| 2008/0190492 A1* | 8/2008 | Fuchs | ................... F16K 15/025 137/540 |
| 2008/0302322 A1* | 12/2008 | Edelmayer | .............. F01L 1/181 123/90.39 |
| 2010/0119395 A1 | 5/2010 | Buckley et al. | |
| 2011/0089359 A1* | 4/2011 | Santamaria | ......... F16K 27/0209 251/337 |
| 2011/0123376 A1* | 5/2011 | Aritomi | ............... F02M 59/462 417/540 |
| 2013/0280112 A1 | 10/2013 | Usui et al. | |
| 2014/0193281 A1* | 7/2014 | Shaull | .................... F04B 53/10 417/567 |

OTHER PUBLICATIONS

International Preliminary Report on Patentability issued by The International Bureau of WIPO, dated Nov. 21, 2017, for International Application No. PCT/US2015/030986; 10 pages.

* cited by examiner

Pre-Installed State

Installed State

HIGH PRESSURE COMMON RAIL FUEL PUMP OUTLET CHECK VALVE SPRING RETAINER METHOD

RELATED APPLICATIONS

The present application is a national phase filing under 35 U.S.C. § 371 of International Application No. PCT/US2015/030986, titled "HIGH PRESSURE COMMON RAIL FUEL PUMP OUTLET CHECK VALVE SPRING RETAINER METHOD," filed on May 15, 2015, the entire disclosure of which being expressly incorporated herein by reference.

FIELD OF THE DISCLOSURE

The present disclosure generally relates to a pumping element of a fuel pump for an internal combustion engine. More specifically, this disclosure relates to an outlet check valve for a pumping element of a fuel pump that permits fuel to exit the pumping element.

BACKGROUND OF THE DISCLOSURE

Fuel pumps typically include pumping elements that comprise a pumping plunger reciprocating within a bore. The pumping plunger's reciprocating motion is typically accomplished with a mechanism with a rotating cam that moves the plunger. The pumping element typically includes a plurality of other components that cooperate with the pumping plunger to pressurize a flow of fluid, typically oil or fuel, for use in an internal combustion engine. For example, a fuel injector might use the flow of pressurized fuel from the fuel pump to inject the fuel or to intensify the pressure of the fuel that is injected into the engine. Additionally, pumping elements typically include valves to permit fuel flow into the pumping element and fuel flow out of the pumping element to one or more fuel injectors. One type of valve is an inlet check valve, which permits fuel to flow into a pumping chamber of the pumping element from a pressurized fuel supply line. Another type of valve is an outlet check valve, which permits highly pressurized fuel to flow from the pumping element to an accumulator, a fuel rail, or to one or more fuel injectors.

Modern fuel systems have evolved to use higher injection pressures for injecting fuel within the combustion chamber of internal combustion engines. However, a variety of issues may arise when attempting to increase the service pressure of a fuel pump and its associated pumping element. For example, increased service pressure increases the thermal load imparted on the components such as outlet check valves which function against highly pressurized fuel reaching pressures in excess of 30,000 pounds per square inch (PSI). Therefore, material and design challenges have a tendency to limit pump outlet pressures due to the enhanced stresses and thermal effects resulting from high service pressures. As such, a need exists for a pumping element having an improved outlet check valve design that addresses current product design challenges, reduces manufacturing costs, and not only meets but exceeds product performance standards.

SUMMARY OF THE DISCLOSURE

In one embodiment of the present disclosure a pumping element is provided comprising a first flow chamber; a second flow chamber in fluid connection with the first flow chamber, the second flow chamber including a shoulder; a check valve including a first insert and a second insert, the first insert being movable between a first position wherein the first insert forms a seal that inhibits fluid flow between the first and second flow chambers and a second position wherein the first insert permits fluid flow between the first and second flow chambers, the second insert being inserted into the second flow chamber to an extent limited by the shoulder; and a spring having a first end engaging the first insert and a second end engaging the second insert; wherein the first insert moves from the first position to the second position against a biasing force of the spring in response to pressurized fluid in the first flow chamber. In one aspect of this embodiment the first insert includes a proximal end, a distal end, and a central bore extending from the proximal end toward the distal end, and the second insert includes a proximal end, a distal end, and a central bore extending from the proximal end toward the distal end. In a variant of this aspect the central bore of the first insert is engaged by the first end of the spring and the central bore of the second insert is engaged by the second end of the spring.

In another aspect of this embodiment the pumping element further includes a third flow chamber in fluid connection with the first and second flow chambers, the first insert inhibiting fluid flow between the first flow chamber and the third flow chamber when in the first position and permitting fluid flow between the first flow chamber and the third flow chamber when in the second position. In yet another aspect the first and second inserts are disposed in the second flow chamber and the second insert is retained in a fixed position by an interference fit with the second flow chamber. In yet another aspect of this embodiment the second insert includes a shell and an insert that is inserted into the shell to cause expansion of the shell to retain the second insert in a fixed position within the second flow chamber. In a variant of this aspect the shell includes an interior portion having a tapered surface and the insert includes an outer tapered surface, the tapered surfaces cooperating to provide a locking mechanism that locks the insert within the shell. In yet another aspect the spring biases the first insert away from the second insert into the first position in response to a pressure of fluid in the first flow chamber being below a predetermined threshold pressure. In yet another aspect of this embodiment the first insert includes a passage providing a fluid flow path for pressurized fluid to flow from the first flow chamber to the second flow chamber and from the first flow chamber to the third flow chamber.

In another embodiment of the present disclosure a pumping element is provided comprising a first flow chamber; a second flow chamber in fluid connection with the first flow chamber, the second flow chamber including a first section having a first diameter and a second section having a second diameter, the first diameter being smaller than the second diameter; a first insert being moveable between a first position wherein the first insert forms a seal that inhibits fluid flow between the first and second flow chambers and a second position wherein the first insert permits fluid flow between the first and second flow chambers; and a second insert disposed within the second section and a third insert disposed within the second section, the second insert intermediate the first insert and the third insert; wherein the first insert moves from the first position to the second position in response to pressurized fluid in the first flow chamber. In one aspect of this embodiment the third insert includes a shell and an insert that is inserted into an interior portion of the shell to provide an interference fit between the third insert and the second section of the second flow chamber.

In another aspect of this embodiment the second insert is slideably inserted within the second section to an extent limited by the shoulder of the second flow chamber; wherein the shoulder is intermediate the first and second sections. In yet another aspect of this embodiment a spring biases the first insert away from the second insert to the first position in response to a pressure of fluid in the first flow chamber being below a predetermined threshold pressure. In yet another aspect of this embodiment the pumping element further includes a third flow chamber in fluid connection with the first and second flow chambers, the first insert inhibiting fluid flow between the first flow chamber and the third flow chamber when in the first position and permitting fluid flow between the first flow chamber and the third flow chamber when in the second position. In a variant of this aspect the first insert abuts an end section of the first flow chamber, the first insert including a passage providing a flow path for pressurized fluid to flow from the first flow chamber to the second flow chamber.

In yet another embodiment of the present disclosure a pumping element is provided comprising a plunger disposed in a pumping chamber and reciprocally moveable along a longitudinal axis of the pumping chamber; an inlet check valve disposed adjacent the pumping chamber to permit pressurized fluid to enter the pumping chamber; a first flow chamber in fluid connection with the pumping chamber, the first flow chamber having a first section and a second section; an outlet check valve disposed in the second section, the outlet check valve including at least a first insert and a second insert disposed adjacent a shoulder, the first insert being movable between a first position and a second position; a spring disposed intermediate the first insert and the second insert, the spring providing a spring force to bias the first insert to the first position to provide a seal between the first section and second section; and wherein the pressurized fluid causes the first insert to move to the second position against the biasing force of the spring in response to movement by the plunger toward the inlet check valve. In one aspect of this embodiment the pumping element further includes a second flow chamber in fluid connection with the first flow chamber, wherein the second flow chamber is intermediate the first section and the second section and pressurized fluid exits the pumping element through one of the first flow chamber or the second flow chamber.

In another aspect of this embodiment the pumping element further includes a third insert disposed within the second section such that the second insert is intermediate the first insert and the third insert, wherein the third insert retains the second insert within the second section. In a variant of this aspect the third insert includes a shell and an insert that is inserted into an interior portion of the shell to provide an interference fit between the third insert and the second section. In yet another aspect of this embodiment the shoulder provides a positional stop for the second insert such that an end section of the second insert abuts the shoulder and the second insert is retained in a fixed position by an interference fit with the second section. In yet another aspect of this embodiment a central bore of the first insert guides a first end of the spring and a central bore of the second insert guides a second end of the spring.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

DETAILED DESCRIPTION OF EMBODIMENTS

The embodiments disclosed herein are not intended to be exhaustive or to limit the disclosure to the precise forms disclosed in the following detailed description. Rather, the embodiments were chosen and described so that others skilled in the art may utilize their teachings.

Figure 1:
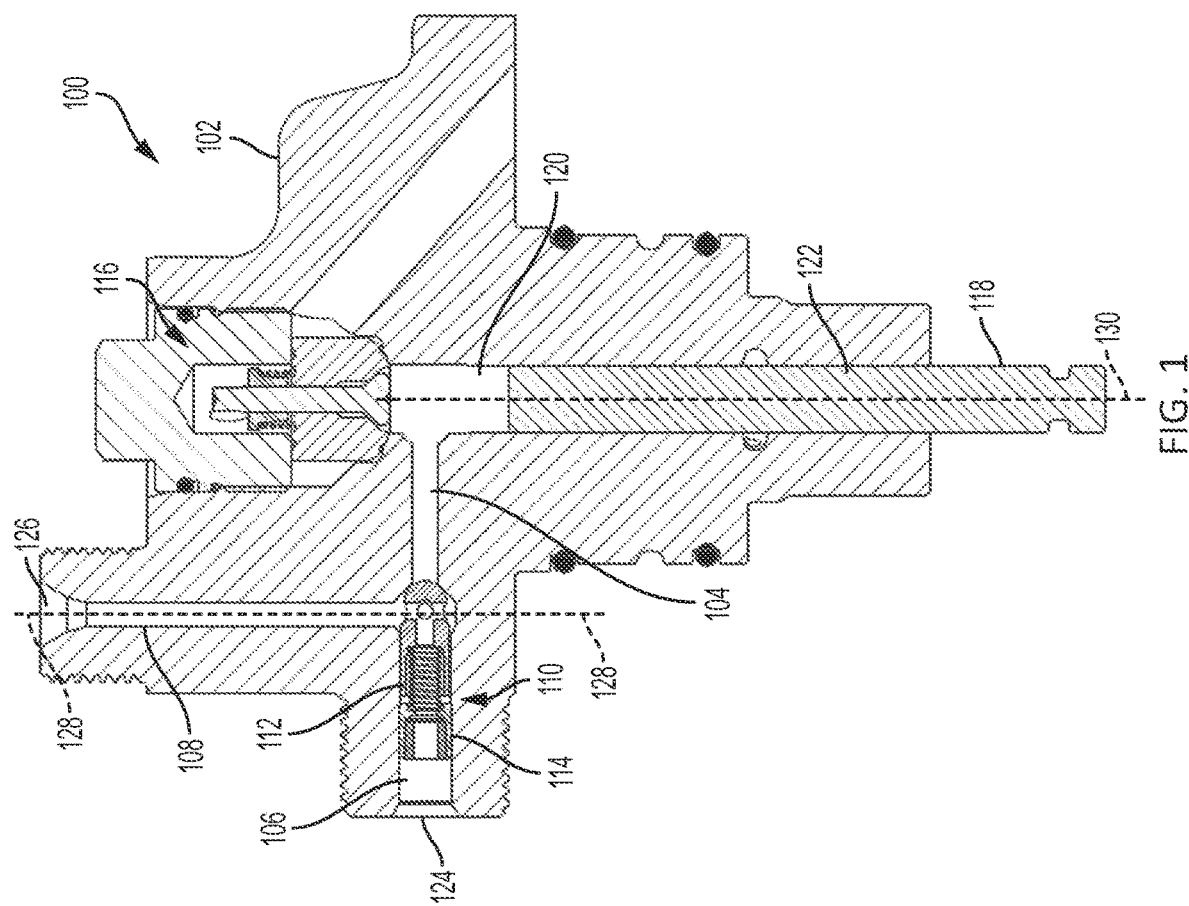
FIG. 1 is a cross-sectional view of a pumping element according to the present disclosure.

In the disclosed embodiment of FIG. 1, pumping element 100 may be arranged within a fuel pump and structured to facilitate the pumping of fuel into a common fuel rail (not shown) of a fuel system of an internal combustion engine (not shown) wherein the common fuel rail supplies pressurized fuel to one or more fuel injectors (not shown) during operation of the internal combustion engine. Other exemplary fuel pumps, various components of the internal combustion engine, as well as mechanical and electrical operation of exemplary fuel systems are described in U.S. Patent Application Publication No. 2014/0193281 A1 published on 10 Jul. 2014, the entire disclosure of which is hereby expressly incorporated herein by reference. Upon review of U.S. Patent Application Publication No. 2014/0193281 A1, those of ordinary skill in the art will understand the description of the internal combustion engine and will further understand the description of fuel system component functionality provided therein. Moreover, those of ordinary skill in the art will further understand how pumping element 100 may facilitate the pumping of high pressure fuel within one or more of the disclosed exemplary fuel systems provided therein.

FIG. 1 is a cross-sectional view of a pumping element according to the present disclosure. Pumping element 100 includes body 102, wherein body 102 generally includes first flow chamber 104, second flow chamber 106, third flow chamber 108 and outlet check valve (hereinafter "OCV") 110 which includes OCV plunger 112 and OCV retainer 114. Pumping element 100 may further include inlet check valve (hereinafter "ICV") 116, pumping plunger 118, pumping chamber 120, plunger bore 122, first fuel outlet 124 and second fuel outlet 126. In various embodiments of the present disclosure, ICV 116 is disposed generally longitudinally above pumping plunger 122. As is known in the art, ICV 116 is generally configured to permit low pressure inlet fuel to enter pumping element 100 at a filling pressure of approximately 150 pounds per square inch (psi). The pressurized inlet fuel entering pumping element 100 may be characterized as low-pressure fuel when contrasted with the highly pressurized outlet fuel which exits pumping element 100 at a pressure of approximately 33,000 psi (i.e. high-pressure fuel). Pumping plunger 118 is disposed within plunger bore 122 and structured for reciprocal movement therein. Pumping plunger 118 may be substantially but not completely disposed within plunger bore 122 so that during reciprocal movement within plunger bore 122, at least a portion of plunger 118 extends outside of plunger bore 122. In various embodiments, pumping plunger 118 is moveable through a pumping stroke and a filling stroke. In the illustrative embodiment of FIG. 1, pumping plunger 118 is shown in a filling stroke position. As described more detail in the disclosed embodiment of FIG. 2, pumping element 100 may include a plurality of flow chambers providing flow paths that permit pressurized fuel to exit pumping element 100. In various embodiments, OCV 110 provides a removable seal between first flow chamber 104 and second flow 106, and between first flow chamber 104 and third flow chamber 108.

While pumping plunger 118 is in a filling stroke position, ICV 116 permits pressurized inlet fuel to fill a volume of space created by pumping plunger 118 moving downwardly along a longitudinal axis 130 thereby defining pumping chamber 120. Longitudinal movement of plunger 118 away from ICV 116 permits low pressure fuel to flow into plunger bore 110, via inlet check valve 116, and creates an intake stroke (i.e. filling stroke), whereas longitudinal movement of plunger 118 toward ICV 116 causes compression or pressurization of fuel in pumping chamber 120 and creates a pressure stroke (i.e. pumping stroke) which causes high pressure fuel to exit pumping element 100. In various embodiments, high pressure fuel exits pumping element 100 via one of first fuel exit 124 and second exit fuel exit 126. If first fuel exit 124 is used then a stop element (not shown) is installed to seal second fuel exit 126. Likewise, if second fuel exit 126 is used then a stop element (not shown) is installed to seal first fuel exit 124. Additionally, although a single pumping element is shown, in various alternative embodiments of the present disclosure multiple pumping elements within an exemplary fuel pump may be configured to operate simultaneously to pump pressurized fuel to a fuel rail or accumulator of an internal combustion engine.

Figure 2:
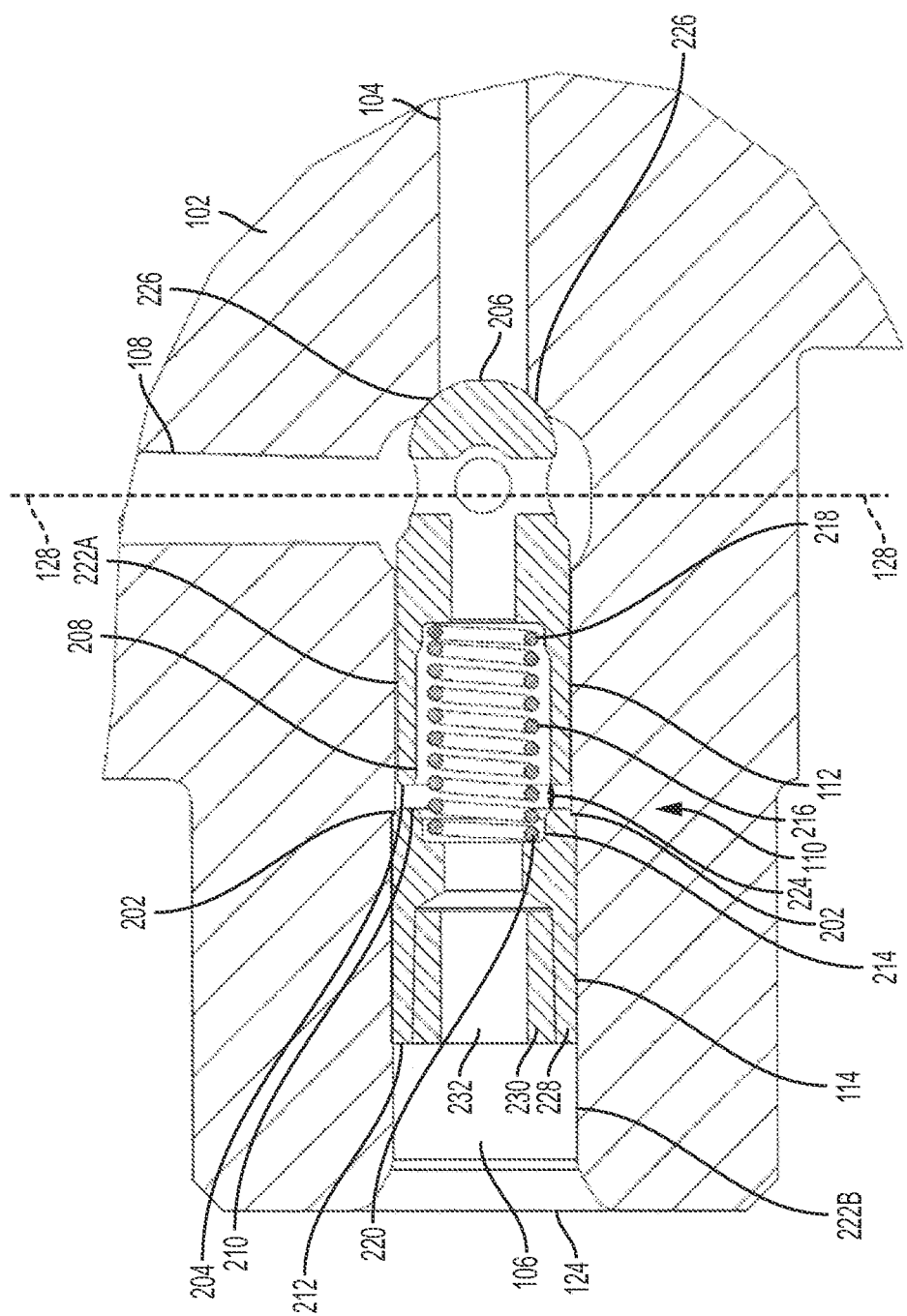
FIG. 2 is an enlarged cross-sectional view of a first outlet check valve of a pumping element according to the present disclosure.

FIG. 2 is an enlarged cross-sectional view of a first OCV of pumping element 100 according to the present disclosure. As noted above, OCV 110 includes OCV plunger 112 and OCV retainer 114. OCV plunger 112 is movably disposed within second flow chamber 106 and cooperates with OCV retainer 114 to provide a removable seal between, for example, first flow chamber 104 and second flow chamber 106. In an alternative embodiment, first flow chamber 104 may include or encompass second flow chamber 106 to form a single flow chamber having a first section and a second section wherein OCV 110 is disposed in the second section. In this embodiment, third flow chamber 108 may then be referred to as a second flow chamber. In another alternative embodiment, first flow chamber 104 is in fluid communication with second flow chamber 106 when a stop element seals second fuel exit 126. Similarly, in a variant of this alternative embodiment, first flow chamber 104 is in fluid communication with third flow chamber 108 when a stop element seals first fuel exit 124. In one embodiment, third flow chamber 108 includes a longitudinal axis 128 and defines a flow path to second exit 126.

OCV 110 further includes spring 216 disposed intermediate OCV plunger 112 and OCV retainer 114. Other types of springs or biasing elements may be used. Spring 216 includes a first end 218 engaging OCV plunger 112 and a second end 220 engaging OCV retainer 114. In one embodiment of the present disclosure, OCV plunger 112 includes a proximal end 204, a distal end 206, and a central bore 208 extending from proximal end 204 toward distal end 206. Likewise, OCV retainer 114 includes a proximal end 210, a distal end 212, and a central bore 214 extending from proximal end 208 toward distal end 212. In various embodiments, central bore 208 of OCV plunger 112 is engaged by first end 218 of spring 216 such that first end 218 is disposed within central bore 208. Also, central bore 214 of OCV retainer 114 is engaged by second end 220 of spring 216 such that second end 220 is disposed within central bore 214. In one embodiment, central bore 208 guides first end 218 of spring 216 and central bore 214 guides second end 220 of spring 216. As shown in the illustrative embodiment of FIG. 2, central bore 208 of OCV plunger 112 may be described as a passage which provides a fluid flow path for pressurized fluid to flow from first flow chamber 104 to second flow chamber 106. Moreover, central bore 214 of OCV retainer 114 may also be described as a passage which provides a fluid flow path for pressurized fluid to flow from second flow chamber 106 to first fuel exit 124. In one embodiment, second flow chamber 106 includes a first section 222A having a first diameter and a second section 222B having a second diameter, the first diameter being smaller than the second diameter. In this embodiment, second flow chamber 106 includes a shoulder 202 located intermediate first section 222A and second section 222B. Shoulder 202 is defined by the difference in the diameter of section 222A and the diameter of section 222B.

During assembly of pumping element 100 and, more particularly, during installation of OCV 110, OCV plunger 112 may be slidably inserted into first section 222A to an extent limited by a curved seating surface 226 that receives distal end 206 of plunger 112. Distal end 206 abuts an end section of first flow chamber 104. Spring 216 exerts a sufficiently strong spring force against OCV plunger 112 to bias OCV plunger 112 toward first flow chamber 104 thereby creating seal between first flow chamber 104 and second flow chamber 106. Following installation of spring 216, OCV retainer 114 is then installed. OCV retainer 114 is structured to retain the components of OCV 110 within second flow chamber 106. In one embodiment, OCV retainer 114 is retained in a fixed position within second flow chamber 106 by an interference fit. Shoulder 202 provides a positional stop for OCV retainer 114 such that proximal end 210 is in abutting engagement with shoulder 202.

As described in more detail in the disclosed embodiment of FIG. 4, OCV retainer 114 may expand during installation within second flow chamber 106 such that OCV retainer 114 is fixed securely within second flow chamber 106 and able withstand the high pressures of the outlet fuel exiting pumping element 100. OCV retainer 114 includes a shell 228 and an insert 230 that is wedged into an interior portion of shell 228 to provide an interference fit between OCV retainer 114 and second flow chamber 106. As described above, OCV retainer 114 is structured to retain the components of OCV 110 within second flow chamber 106. Additionally, OCV retainer 114 includes a central bore 232 that provides a fluid flow path for pressurized fluid to flow from second flow chamber 106 to first fuel exit 124. While central bore 232 is depicted as extending through insert 230, it should be understood that other flow path configurations may be used. For example, insert 230 and/or shell 228 may include or together form one or more grooves, channels, bores, flutes or other passageways to permit fluid flow through OCV retainer 114.

Proximal end 204 of OCV plunger 112 and proximal end 210 of OCV retainer 114 cooperate to form a stroke gap 224.

In one embodiment, during operation of pumping element 100, OCV plunger 112 moves toward OCV retainer 114 by the distance defined by stroke gap 224 when pressurized fuel within first flow chamber 104 exceeds a predetermined threshold pressure. Stated another way, spring 216 biases OCV plunger 112 away from OCV retainer 114 to cause OCV plunger 112 to provide a removable seal in response to the pressure of fuel or fluid in first flow chamber 104 being below a predetermined threshold pressure. Accordingly, OCV plunger 112 moves toward OCV retainer 114 against a biasing force of spring 216 in response to the presence of pressurized fuel or fluid in first flow chamber 104 exceeding the predetermined threshold pressure, thereby eliminating the seal between first flow chamber 104 and second flow chamber 106.

Figure 3:
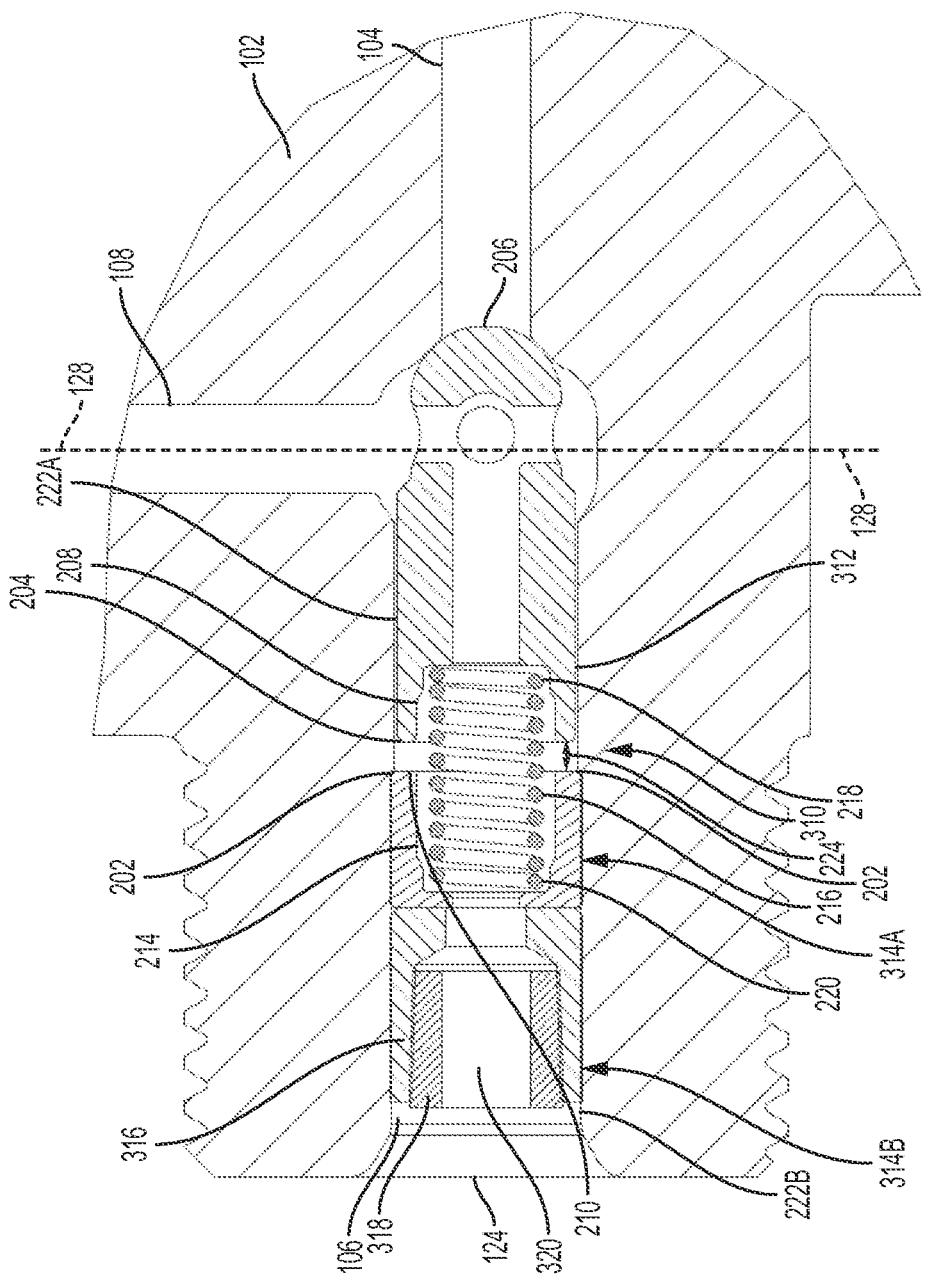
FIG. 3 is an enlarged cross-sectional view of a second outlet check valve of a pumping element according to the present disclosure.

FIG. 3 is an enlarged cross-sectional view of a second OCV of pumping element 100 according to the present disclosure. As described above in the disclosed embodiments of FIGS. 1 and 2, OCV 110 may include a first insert, namely OCV plunger 112, and a second insert, namely OCV retainer 114. The disclosed embodiment of FIG. 3 includes substantially the same components as the embodiment of FIG. 2 except that the embodiment of FIG. 3 includes OCV 310 having a design that differs slightly from the design of OCV 110. As shown in FIG. 3, OCV 310 includes a first insert, namely OCV plunger 312, a second insert, namely OCV retainer 314A, and a third insert, namely OCV retainer 314B. As described in more detail below, OCV retainer 314B includes a shell 316 and an insert 318 that is wedged into an interior portion of shell 316 to provide an interference fit between OCV retainer 314B and second flow chamber 106. As described above, OCV retainer 314B is structured to retain the components of OCV 310 within second flow chamber 106. In one embodiment, OCV retainer 314A and 314B may be retained in a fixed position within second flow chamber 106 by an interference fit. In the illustrative embodiment of FIG. 3, shoulder 202 provides a positional stop for OCV retainer 314A such that proximal end 210 is in abutting engagement with shoulder 202. OCV retainer 314B may expand during installation within second flow chamber 106 such that OCV retainer 314B is fixed securely within second flow chamber 106 and able withstand the high pressures of the outlet fuel exiting pumping element 100. Additionally, OCV retainer 314B includes a central bore 320 that provides a fluid flow path for pressurized fluid to flow from second flow chamber 106 to first fuel exit 124. While central bore 320 is depicted as extending through insert 318, it should be understood that other flow path configurations may be used. For example, insert 318 and/or shell 316 may include or together form one or more grooves, channels, bores, flutes or other passageways to permit fluid flow through OCV retainer 314B.

Figure 4A:
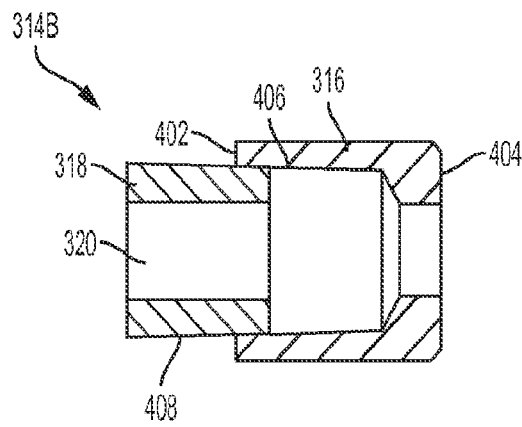
FIG. 4A is a cross-sectional view of a retainer element of an outlet check valve in a pre-installed state according to the present disclosure.
Figure 4B:
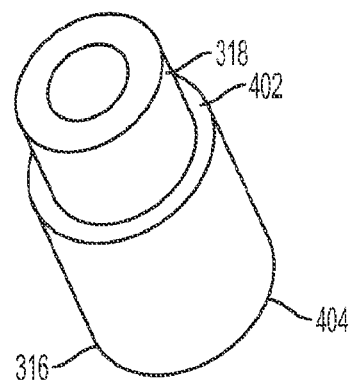
FIG. 4B is an isometric view of the retainer element of FIG. 4A.
Figure 4C:
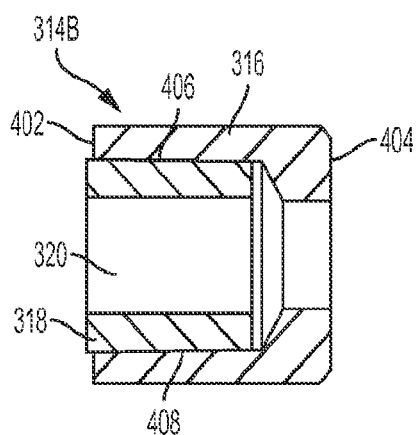
FIG. 4C is a cross-sectional view of a retainer element of an outlet check valve in an installed state according to the present disclosure.
Figure 4D:
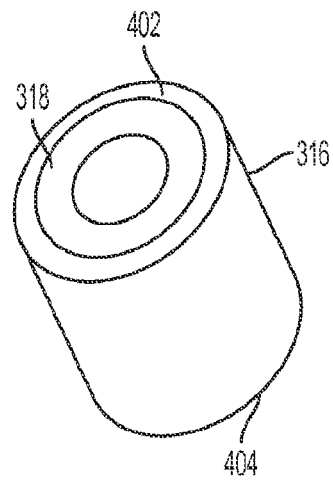
FIG. 4D is an isometric view of the retainer element of FIG. 4C.

FIGS. 4A and 4B provide cross-sectional and isometric views respectively of OCV retainer 314B in a pre-installed state according to the present disclosure. Likewise, FIGS. 4C and 4D provide cross-sectional and isometric views respectively of OCV retainer 314B in an installed state according to the present disclosure. As noted above, OCV retainer 314B includes a shell 316 and an insert 318 that is wedged into an interior portion of shell 316 to provide an interference fit between OCV retainer 314B and second flow chamber 106. OCV retainer 314B further includes a first end 402, a second end 404, a tapered surface 406 in the interior portion of shell 316. Insert 318 includes a tapered outer surface 408. During installation within second flow chamber 106, shell 316 is installed following OCV retainer 314A such that second end 404 abuts or contacts OCV retainer 314A. Following the installation of shell 316, as shown in the illustrative embodiment of FIG. 4A, insert 318 is wedged into the interior of shell 316 starting from first end 402 toward second end 404. In one embodiment, the dimensions of tapered outer surface 408 of insert 318 are slightly larger than the dimensions of tapered surface 406 of the interior portion of shell 316. The dimensional difference between tapered outer surface 408 and tapered surface 406 creates a locking mechanism that locks insert 318 within shell 316. In one embodiment, the taper angle of surface 408 and surface 406 is 7 degrees or less. During movement of OCV retainer 314B into the installed state depicted in FIGS. 4C and 4D, as insert 318 slides into and mates with shell 316, shell 316 expands against the walls of second flow chamber 106 which retains and secures OCV retainer 314B in a fixed position.

In the foregoing specification, specific embodiments of the present disclosure have been described. However, one of ordinary skill in the art will appreciate that various modifications and changes can be made without departing from the scope of the disclosure as set forth in the claims below. Accordingly, the specification and figures are to be regarded in an illustrative rather than a restrictive sense. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

The invention claimed is:

1. A pumping element comprising:
   a first flow chamber;
   a second flow chamber in fluid connection with the first flow chamber, the second flow chamber including a shoulder;
   a check valve including a first insert and a second insert, the first insert being disposed next to and apart from the second insert, the first insert being movable between a first position and a second position, wherein the first insert forms a seal that inhibits fluid flow between the first and second flow chambers when in the first position and the first insert permits fluid flow between the first and second flow chambers when in the second position, the second insert being inserted into the second flow chamber to an extent limited by the shoulder, wherein the second insert includes a shell and an insert inserted into the shell to cause expansion of the shell to retain the second insert in a fixed position within the second flow chamber; and
   a spring having a first end engaging the first insert and a second end engaging the second insert, wherein the first insert moves from the first position to the second position against a biasing force of the spring in response to pressurized fluid in the first flow chamber.

2. The pumping element of claim 1, wherein the first insert includes a proximal end, a distal end, and a central bore extending from the proximal end toward the distal end, and the second insert includes a proximal end, a distal end, and a central bore extending from the proximal end toward the distal end.

3. The pumping element of claim 2, wherein the central bore of the first insert is engaged by the first end of the spring and the central bore of the second insert is engaged by the second end of the spring.

4. The pumping element of claim 1, further comprising a third flow chamber in fluid connection with the first flow chamber when a stop element seals an exit of the second flow chamber, the first insert inhibiting fluid flow between the first flow chamber and the third flow chamber when in the first position and permitting fluid flow between the first flow chamber and the third flow chamber when in the second position.

5. The pumping element of claim 4, wherein the first insert includes a passage providing a fluid flow path for pressurized fluid to flow from the first flow chamber to the second flow chamber or from the first flow chamber to the third flow chamber when the stop element seals the exit of the second flow chamber.

6. The pumping element of claim 1, wherein the first and second inserts are disposed in the second flow chamber, and the second insert is retained in the fixed position by an interference fit provided by the shell and the insert.

7. The pumping element of claim 1, wherein the shell includes an interior portion having an inner tapered surface and the insert includes an outer tapered surface, the inner and outer tapered surfaces cooperating to lock the insert within the shell.

8. The pumping element of claim 1, wherein the spring biases the first insert away from the second insert into the first position in response to a pressure of fluid in the first flow chamber being below a predetermined threshold pressure.

9. A pumping element comprising:
- a plunger disposed in a pumping chamber and reciprocally moveable along a longitudinal axis of the pumping chamber;
- an inlet check valve disposed adjacent the pumping chamber to permit pressurized fluid to enter the pumping chamber;
- a first flow chamber in fluid connection with the pumping chamber, the first flow chamber having a first section and a second section;
- an outlet check valve disposed in the second section including at least a first insert and a second insert disposed adjacent a shoulder, the first insert being disposed next to and apart from the second insert, the first insert being movable between a first position and a second position, the second insert including a shell and an insert inserted into the shell to cause expansion of the shell to retain the second insert in a fixed position within the second section;
- a spring disposed intermediate the first insert and the second insert, the spring providing a biasing force to bias the first insert to the first position to provide a seal between the first section and the second section; and
- wherein the pressurized fluid causes the first insert to move to the second position against the biasing force of the spring in response to movement by the plunger toward the inlet check valve.

10. The pumping element of claim 9, further comprising a second flow chamber in fluid connection with the first flow chamber, wherein pressurized fluid exits the pumping element through one of the first flow chamber or the second flow chamber.

11. The pumping element of claim 9, wherein the shoulder provides a positional stop for the second insert such that an end section of the second insert abuts the shoulder and the second insert is retained in the fixed position by an interference fit provided by the shell and the insert.

12. The pumping element of claim 9, wherein a central bore of the first insert guides a first end of the spring and a central bore of the second insert guides a second end of the spring.

* * * * *